April 12, 1932.  W. R. JORDAN  1,853,817
TRAILER AND STEERING DEVICE
Filed March 21, 1931  2 Sheets-Sheet 1

Inventor
William R. Jordan
By E. H. Bond
Attorney

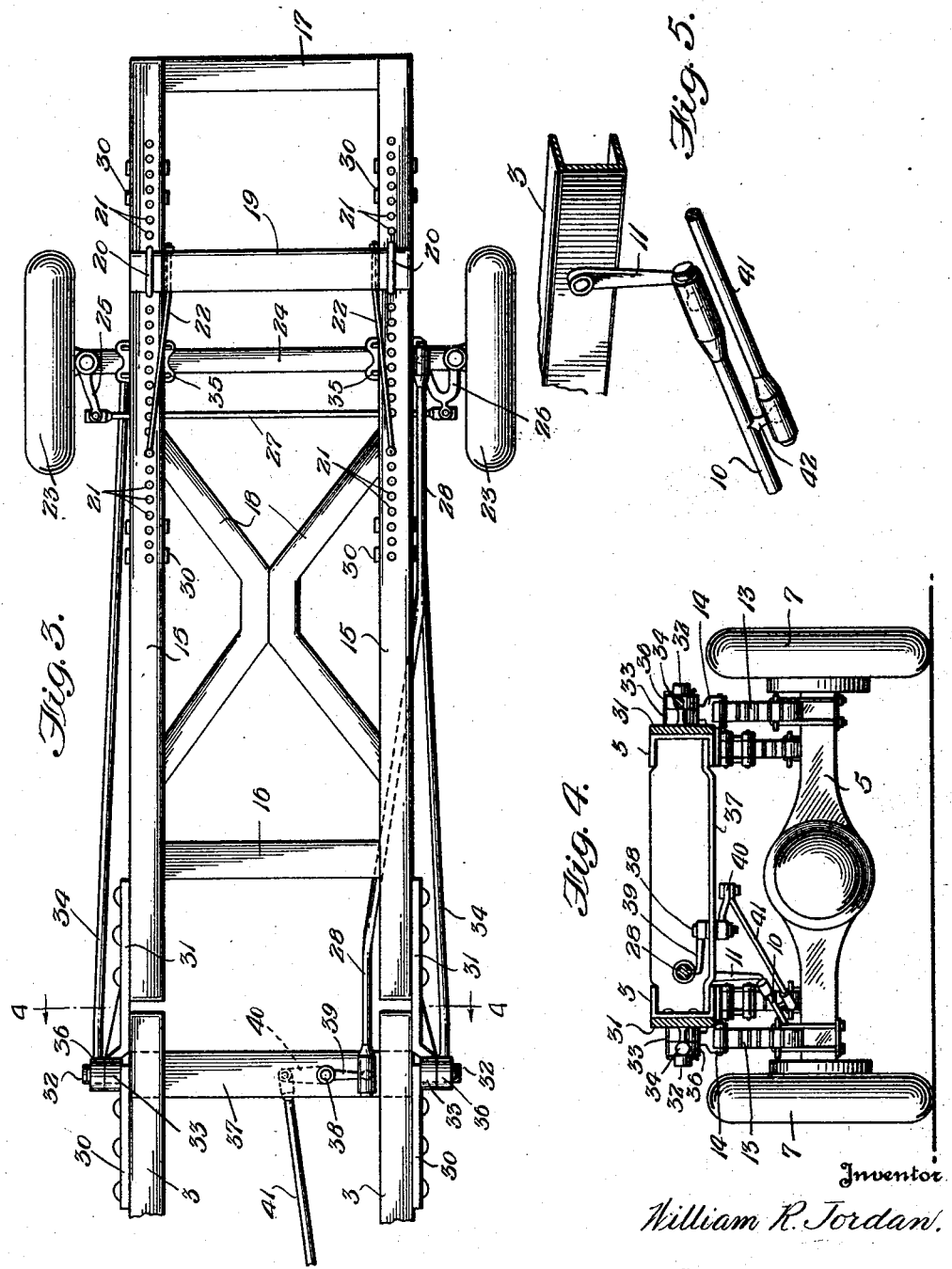

Patented Apr. 12, 1932

1,853,817

UNITED STATES PATENT OFFICE

WILLIAM R. JORDAN, OF BONITA, LOUISIANA

TRAILER AND STEERING DEVICE

Application filed March 21, 1931. Serial No. 524,368.

This invention relates to vehicles and more particularly to a trailer and improved steering means therefor.

When a trailer is in use it is hitched behind a truck or other motor vehicle and difficulty is often experienced when making turns as the trailer does not properly follow the truck. Means to steer a trailer have previously been provided but they have not proved satisfactory as wheels of the trailer were not accurately adjusted when making a turn and also vertical movements of the truck and trailer relative to each other were liable to interfere with proper operation of the steering mechanism and often caused it to be broken.

Therefore, one object of this invention is to provide a trailer having improved means for connecting it with a truck in trailing relation thereto and also improved steering means for wheels of the trailer, the steering means being so constructed that wheels of the trailer will accurately follow tracks of the front wheels of the truck. Therefore, the driver of the truck need not watch the rear end of the trailer when making a turn or entering a narrow space as he will know that the wheels of the trailer will exactly follow the front wheels and can always face the front, or when backing out of an alley, can look rearwardly.

Another object of the invention is to so connect the trailer with the truck that vertical movements may take place thereby causing wheels of the truck and trailer to remain in contact with the ground even when traveling along rough ground or over uneven places such as a railroad crossing.

Another object of the invention is to provide draft bars for the trailer so associated with the truck and trailer that strain will be removed from the means connecting the trailer to the truck and vertical movements of the truck and trailer relative to each other not interfered with and also strain removed from the steering means for the trailer wheels.

Another object of the invention is to provide a trailer having a load supporting bolster which can be adjusted longitudinally of the trailer and thereby accommodate itself to the length of a beam or other long object being transported and properly support the load.

Other objects and advantages of the invention will hereinafter appear, and the novel features thereof will be specifically defined by the appended claims.

The invention in its preferred form, is clearly illustrated in the accompanynig drawings, which, with the numerals of reference marked thereon, form a part of this specification, and in which Fig. 1 is a top plan view showing the trailer hitched to a truck.

Fig. 3 is a top plan of the trailer upon an enlarged scale.

Fig. 4 is a transverse sectional view taken along the line 4—4 of Fig. 3.

Fig. 5 is a fragmentary perspective view of the steering mechanism.

Figure 1:
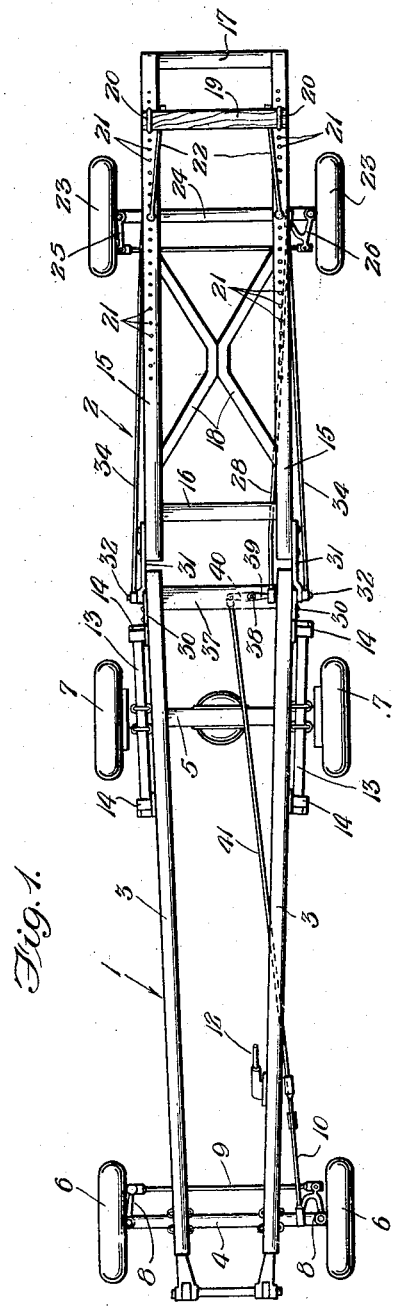

The truck or other motor vehicle to which the trailer 2 has been shown connected is of a conventional construction and only the chassis thereof has been shown. This chassis has the usual side bars 3, front and rear axles 4 and 5 and front and rear wheels 6 and 7. The spindles for the front wheels are provided with the usual knuckle arms 8 connected by a cross rod 9 and to one arm is pivoted the front end of a drag link or rod 10 having its rear end pivoted to the usual steering arm 11 carried by the adjacent chassis bar and actuated by the steering post 12. This is all conventional construction. The springs 13 for the rear axle are connected with the chassis bars by shackles 14 at both ends.

Figure 2:
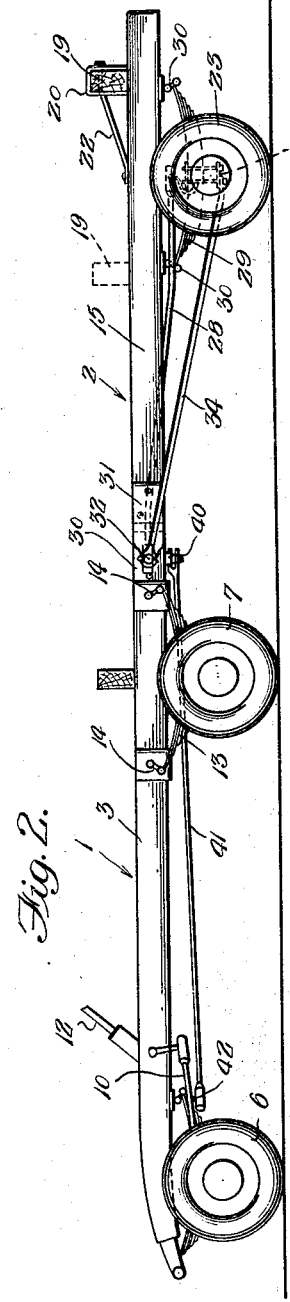
Fig. 2 is a side elevation of the truck and trailer.

The trailer 2 has side bars 15 joined by cross bars 16 and 17 and braced by yokes 18. A bolster 19 extends across the trailer frame and has its ends resting upon the side bars 15 thereof where they are secured by U-shaped fasteners 20 having their arms engaged through certain of the openings 21 formed through the side bars. There have also been provided bracing rods 22 which extend through the bolster and have the front ends secured by fasteners engaged in certain of the openings 21. Therefore, this bolster may be adjusted longitudinally upon the chassis as indicated by dotted lines in Fig. 2 and securely held in a desired position and prevented from slipping or turning over.

The wheels 23 for the trailer are mounted upon spindles pivoted to ends of an axle 24 and provided with knuckle arms 25 and 26 connected by a rod 27 corresponding to the arm 8 and rod 9. To the arm 26 is pivoted the rear end of a shift rod 28 which extends longitudinally of the trailer and when moved longitudinally causes the wheels to be turned for steering the tractor in the same manner in which the wheels 6 are turned to steer the truck. The springs 29 for the axle 24 are connected at each end to the side bars 15 by shackles 30. Therefore a very good spring action is established.

In order to hitch the trailer to the truck chassis there have been provided hinge plates 30 and 31 secured respectively against outer side faces of the side bars 3 and 15, the plates 30 carrying outstanding pintles 32 and the plates 31 being formed with eyes 33 engaged about the pintles. The truck and trailer may, therefore, have vertical tilting movement relative to each other in order to follow uneven places in a road but since the plates 31 overlap rear ends of the bars 3 the trailer will be held against shifting transversely and its side bars retained in longitudinal alinement with side bars of the truck chassis. Draft rods 34 extend longitudinally of the trailer with their rear ends secured to the axle 24 by clamps 35 and at their front ends are provided with eyes 36 engaged about the pintles 32. By this arrangement strain is removed from the plates 31 and the trailer may tilt vertically freely as the eyes 33 turn freely about the pintles.

A cross strip 37 extends between and is supported by rear ends of the chassis bars 3 and through this strip is rotatably engaged a stem or short shaft 38 having levers 39 and 40 fixed upon its upper and lower portions and projecting from the stem in opposite directions. The free end of the upper arm or lever is turned upwardly and pivoted to the front end of the rod 28 and the free end of a drag link or rod 41 which extends longitudinally of the truck chassis beneath the same and is pivoted to a shank or arm 42 projecting from the rod 10 near its rear end. Therefore, when the rod 10 is shifted longitudinally to turn the wheels 6 toward the right or left, the rod 41 will be shifted in the same direction and through the medium of the levers 40 and 39 the rod 28 will also be shifted longitudinally but in an opposite direction. This will cause the wheels 23 to be shifted in a direction opposite to that in which the wheels 6 are turned and the rear end of the trailer caused to swing outwardly when a turn is made. In practice it has been found that the wheels 23 exactly follow the tracks of the front wheels and therefore the driver only need watch the front of his truck, and if the front wheels make a turn properly without striking a curb or other obstruction, he will know that the rear end of the trailer will make the turn properly.

It should be noted that universal joint between the rod 28 is in alinement with the axis of the pintles 32 as shown in Fig. 4. Therefore, when the truck and trailer are moving across rough ground or along an uneven road and the trailer rocks vertically the eyes 33 and 30 can turn about the pintles without the rod 28 being bent or the rear wheels being shifted inadvertently.

Figure 6:
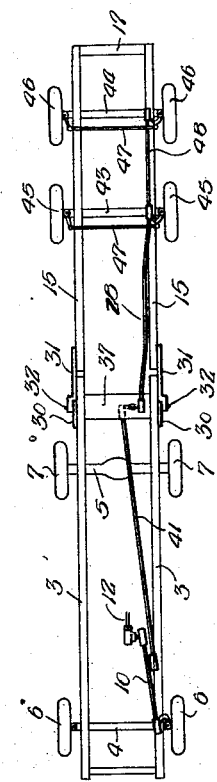
Fig. 6 is a top plan view showing a modified form of trailer.

In Fig. 6 there has been illustrated a slightly modified construction. In this form of the invention, the trailer is longer and is provided with two axles 43 and 44 having spindles at their ends upon which wheels 45 and 46 are mounted. Each axle has the knuckle arms of its spindles connected by a cross shaft 47 and the rod 28 is pivoted to the knuckle arm of the axle 43 corresponding to the arm 26. An extension rod 48 connects the rear end of the rod 28 with the corresponding knuckle arm of the axle 44. Therefore, both sets of wheels 45 and 46 will be shifted at the same time and a long trailer can be steered as accurately as a shorter one.

It will be readily understood that the steering mechanism shown in the drawings and described above can be used for shifting front and rear wheels of an elongated vehicle such as a ladder truck used by fire departments.

Modifications in detail may be resorted to without departing from the spirit of the invention and without sacrificing any of its advantages.

Having thus described my invention what I claim as new and desire to secure by Letters Patent is:

1. In a vehicle train having a plurality of chassis elements and a pivotal connection between said chassis elements, draft elements extending longitudinally of the rear chassis elements with their rear ends secured thereto and their front ends pivoted to the front chassis element in alinement with the pivotal connection between the chassis elements.

2. In a vehicle train having a plurality of chassis elements and a pivotal connection between said chassis elements, draft elements extending longitudinally of the rear chassis element with their read ends secured thereto and their front ends pivoted to the front chassis element and serving to remove strain from the pivotal connection between said chassis element and permit the rear chassis element to have free rocking motion in a vertical direction relative to the front chassis element.

3. In a vehicle train having a front chassis and a rear chassis, pintles extending from sides of the front chassis adjacent its rear end, and hinge members carried by the rear chassis and projecting forwardly therefrom to overlap the sides of the front chassis and pivoted upon said pintles, said hinge members preventing transverse shifting of the rear chassis, and draft elements extending longitudinally of the rear chassis with their rear ends secured thereto and their front ends projecting from the front end thereof and pivotally mounted upon said pintles.

4. In a vehicle train having a front chassis and a rear chassis, pintles extending from sides of the front chassis adjacent its rear end, hinge members carried by the rear chassis and projecting forwardly therefrom to overlap the sides of the front chassis and pivoted upon said pintles, and draft rods extending longitudinally of the rear chassis with their rear ends secured to the axle thereof and their front ends projecting forwardly from the rear chassis and pivoted upon said pintles.

5. In a vehicle train having a front chassis and a rear chassis, pintles extending from the sides of the front chassis adjacent its rear end, hinge members carried by the rear chassis and projecting forwardly therefrom and pivoted upon said pintles, wheels for each chassis, spindles for said wheels pivotally mounted and having knuckle arms, rods connecting the knuckle arms of the companion wheels, a steering gear for the front chassis including a drag link pivoted to the knuckle arm of one wheel thereof, a draw rod pivoted to said drag link and extending toward the rear of the front chassis, a draw rod pivoted to the knuckle arm of one of the rear wheels and extending towards the front of the rear chassis and projecting forwardly therefrom, a cross strip extending transversely of the front chassis between said pintles, a stem extending vertically through said cross strip and rotatable therein, and arms extending transversely from the upper and lower ends of said stem and pivoted to the adjacent end of said draw rods.

In testimony whereof I affix my signature.

WILLIAM R. JORDAN.